US008972123B2

(12) United States Patent
Smith et al.

(10) Patent No.: US 8,972,123 B2
(45) Date of Patent: Mar. 3, 2015

(54) INITIATING TRACTOR STOP AND BALE WRAP FUNCTION

(71) Applicant: CNH America LLC, New Holland, PA (US)

(72) Inventors: Kevin M. Smith, Narvon, PA (US); Riccardo Morselli, Modena (IT); Mark Wilenieo, Saskatoon (CA); James W. Henry, Saskatoon (CA); Gianluca Conti, Modena (IT); Christopher A. Foster, Mohnton, PA (US); Mark K. Chow, Paoli, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/034,531

(22) Filed: Sep. 23, 2013

(65) Prior Publication Data

US 2014/0020352 A1 Jan. 23, 2014

Related U.S. Application Data

(63) Continuation of application No. 13/292,821, filed on Nov. 9, 2011, now Pat. No. 8,577,563.

(51) Int. Cl.
*A01F 15/08* (2006.01)
*F16H 61/70* (2006.01)

(52) U.S. Cl.
CPC .............. *A01F 15/0841* (2013.01); *A01F 15/08* (2013.01); *F16H 61/70* (2013.01); *A01F 15/0833* (2013.01)
USPC .............. 701/50; 701/51; 56/10.2 A; 56/11.7; 475/198

(58) Field of Classification Search
CPC ...... A01F 15/08; A01F 15/0841; F16H 61/70
USPC ............ 701/50, 51; 56/10.2 A, 11.7; 475/198
See application file for complete search history.

(56) References Cited

U.S. PATENT DOCUMENTS

| 4,674,403 A | 6/1987 | Bryant et al. |
|---|---|---|
| 4,771,657 A | 9/1988 | Iwatsuki |
| 4,855,924 A | 8/1989 | Strosser et al. |
| 5,226,359 A | 7/1993 | Rempe |
| 5,243,522 A | 9/1993 | Salzmann |
| 5,444,623 A | 8/1995 | Genise |
| 5,551,218 A | 9/1996 | Henderson et al. |
| 5,687,548 A | 11/1997 | McClure et al. |
| 5,813,204 A | 9/1998 | Pecenka et al. |
| 6,161,368 A | 12/2000 | Wilkens et al. |
| 6,272,825 B1 | 8/2001 | Anderson et al. |

(Continued)

FOREIGN PATENT DOCUMENTS

WO 2012146580 A1 11/2012

*Primary Examiner* — Mary Cheung
*Assistant Examiner* — Brian P Sweeney
(74) *Attorney, Agent, or Firm* — Patrick M. Sheldrake; Seyed V. Sharifi T.

(57) ABSTRACT

A combination tractor and baler is provided to automate tractor stopping and baler wrapping while incorporating operator interaction to improve the efficiency of the tractor and baler combination in operation. Automated control systems and manual operator devices are utilized to improve the timing of the tractor stop and baler wrapping time sequences. Various methods to improve efficiency, including methods to synchronize tractor stop with wrapping activation are provided.

21 Claims, 10 Drawing Sheets

(56) References Cited

U.S. PATENT DOCUMENTS

| | | |
|---|---|---|
| 6,339,741 B1 | 1/2002 | Ritter et al. |
| 6,428,446 B1 | 8/2002 | Ohtsuka |
| 6,446,548 B2 | 9/2002 | Chow |
| 6,546,705 B2 | 4/2003 | Scarlett et al. |
| 6,651,416 B2 | 11/2003 | Trelstad et al. |
| 6,675,561 B2 | 1/2004 | Davis et al. |
| 6,811,015 B2 | 11/2004 | Tietze |
| 7,404,355 B2 | 7/2008 | Viaud et al. |
| 7,409,814 B2 | 8/2008 | Hood et al. |
| 7,448,316 B2 | 11/2008 | Posselius |
| 7,464,523 B2 | 12/2008 | Vande Ryse et al. |
| 8,527,156 B2 | 9/2013 | Martin et al. |
| 2004/0217645 A1 | 11/2004 | Ponet et al. |
| 2007/0142994 A1 | 6/2007 | Boecker et al. |
| 2008/0224445 A1 | 9/2008 | Viaud et al. |
| 2008/0282647 A1 | 11/2008 | Hood et al. |
| 2009/0107102 A1* | 4/2009 | Biziorek ................ 56/341 |

* cited by examiner

| RANGE SPEED | S | M | F | R |
|---|---|---|---|---|
| AC | 1 | 7 | 13 | R1 |
| BC | 2 | 8 | 14 | R2 |
| AD | 3 | 9 | 15 | R3 |
| BD | 4 | 10 | 16 | R4 |
| AE | 5 | 11 | 17 | R5 |
| BE | 6 | 12 | 18 | R6 | though an interface that the predetermined bale size has been

INITIATING TRACTOR STOP AND BALE WRAP FUNCTION

CROSS-REFERENCE TO RELATED APPLICATIONS

This application is a continuation of U.S. patent application Ser. No. 13/292,821, filed Nov. 9, 2011, currently pending, the contents of which are incorporated herein by reference in its entirety.

TECHNOLOGY FIELD

The present invention relates generally to the combination of agricultural tractors and balers, and more particularly, an improved tractor stop sequence to control bale wrapping in a baler.

BACKGROUND

Agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, for example a round baler, is pulled by a tractor to travel along the windrows and pick up the crop material to form a round bale inside the baling chamber of the baler.

When the bale size reaches a particular size, the driver manually stops the tractor and initiates bale wrapping to wrap the finished bale with netting, wrapping, or twine. This typically requires the operator to press the clutch, put the tractor in neutral and hold down the brake. After the bale is wrapped, the bale is ejected from the back of the baler to the ground manually by the operator by typically pulling a hydraulic lever.

The operator manually restarts the tractor by disengaging the brake and clutch to drive the tractor to pick up crop material for the baling process to begin again. This bale forming and wrapping is repeated with the operator being tasked to manually conduct tractor stopping operation before initiating bale wrapping and bale ejection. The operator then manually restarts the tractor following bale wrapping and ejection. This is repetitive and time consuming.

What is needed is an automated tractor stop integrated with bale wrapping functionality that incorporates operator notification and interaction during the tractor stop process.

SUMMARY

Embodiments of the present invention provide a tractor and baler combination and method to improve tractor stop sequence to control bale wrapping in a baler.

Embodiments of the present invention are directed to a combination of a tractor and baler including one or more bale sensors located in proximity to a baling chamber in the baler to detect whether a bale has reached a predetermined size in the baling chamber. The combination of a tractor and baler also includes a baler controller located in the tractor for initiating bale wrapping and for receiving information pertaining to whether the bale reached the predetermined size from the one or more bale sensors. The combination of a tractor and baler further includes a tractor stop command device located in the tractor for activation by an operator after the predetermined bale size has been reached. One or more speed sensors are located in proximity to a tractor driving system in the tractor to detect speed of the tractor. A tractor controller is connected to the stop command device and a tractor driving system. The tractor controller initiates a tractor stop by adjusting the tractor driving system based on information pertaining to speed received by the tractor controller from the one or more speed sensors after the stop command device has been activated. The combination of a tractor and baler further includes a processor in the tractor controller to generate a value from sensed speed information and a communication link between the baler controller and traffic controller. The tractor controller informs the baler controller to initiate bale wrapping at the generated value.

According to one embodiment of the invention, the combination of a tractor and baler further includes a baler operator interface connected to the baler controller to transmit to an operator a notification that the predetermined bale size has been reached from the baler controller.

According to another aspect of one embodiment of the invention, the value is a predetermined speed of the tractor. According to another aspect of one embodiment of the invention, the predetermined speed is about 0 miles per hour. According to another aspect of one embodiment of the invention, the baler controller initiates the wrapping at approximately the same time the detected speed of the tractor equals about 0 miles per hour. According to another aspect of one embodiment of the invention, the value is a predetermined time from when the tractor controller initiates the tractor stop, wherein the predetermined time is calculated by the tractor controller from tractor deceleration rate and current detected speed of the tractor.

According to another aspect of one embodiment of the invention, the combination of a tractor and baler further includes memory located in the tractor controller for storing previous tractor stop times and detected tractor speeds at the related stop times. The value is a predetermined time from when the tractor controller initiated the tractor stop. The predetermined time is calculated by the tractor controller from the stored previous tractor stop times and detected tractor speeds at the related stop times.

According to another aspect of one embodiment of the invention, the combination of a tractor and baler further includes a powershift transmission system in the tractor driving system that is automatically controlled by the tractor controller to stop the tractor and hold the tractor in place with an engine of the tractor still running and brakes of the tractor not applied when the tractor controller initiates the tractor stop. The tractor controller initially engages a first set of clutches to lock up the transmission from turning, then disengages a second pair of clutches to allow the engine to rotate free from the transmission, and then engages one of several rear axial clutches to connect the transmission with a rear axial to lock wheels of the tractor from movement.

According to another aspect of one embodiment of the invention, the combination of a tractor and baler further includes a tractor operator interface connected to the tractor controller to transmit to an operator a permission request to initiate a tractor stop prior to the tractor controller initiating the tractor stop.

Embodiments of the present invention are directed to methods for stopping a tractor to wrap a bale in a baler connected to the tractor. In one embodiment, the method includes driving the tractor connected to the baler by an operator. The method further includes receiving at a baler controller information pertaining to a predetermined bale size in a bale chamber of the baler from one or more bale sensors located in proximity to the bale chamber. The method further includes informing the operator of the tractor from the baler controller through an interface that the predetermined bale size has been reached and activating a stop command device by the operator to initiate a stop command after the operator is informed that the predetermined bale size has been reached. The method further includes receiving the stop command at a tractor controller from the stop command device and initiating at the tractor controller a stop sequence to stop the tractor after receiving the stop command. The method further includes receiving tractor speed information at the tractor controller from one or more speed sensors in proximity to a transmission system of the tractor and commanding the baler controller from the tractor controller to initiate a net wrapping sequence after receiving sensed speed information at the tractor controller. The method further includes initiating a net wrapping sequence by the baler controller after receiving command from the tractor controller and wrapping the bale in the bale chamber at a particular time after the net wrapping sequence is initiated by the baler controller.

According to another embodiment of the invention, the method further includes driving the tractor for a specified drive time as determined by the operator after the step when the operator is informed that the predetermined bale size has been reached and prior to the step of activating a stop command device. The specified drive time includes a time to finish collecting crop material into the baler from the remainder of a window.

According to another embodiment of the invention, the method further includes receiving the stop command at the baler controller and relaying the stop command to the tractor controller from the baler controller after activation of the stop command device by the operator.

According to another embodiment of the invention, the method further includes generating a predetermined speed by the tractor controller and monitoring for a speed in the speed information equal to the predetermined speed at the tractor controller after initiating the stop sequence. According to another aspect of one embodiment of the invention, commanding the baler controller to initiate the net wrapping sequence further includes commanding the initiation of net wrapping sequence after the speed in the speed information equals the predetermined speed.

According to another embodiment of the invention, the method further includes predicting a predetermined time at the tractor controller for the tractor to come to a stop and monitor at the tractor controller the time since initiating the stop sequence for when the predicted predetermined time is achieved. According to another aspect of one embodiment of the invention, commanding the baler controller to initiate the net wrapping sequence further includes commanding the baler controller to initiate the net wrapping sequence so that wrapping the bale in the baling chamber begins when the predetermined time is achieved.

According to another aspect of one embodiment of the invention, the method further includes storing previously sensed tractor speed information in the tractor controller. According to another aspect of one embodiment of the invention, the method further includes predicting the predetermined time by calculating at the tractor controller deceleration rate of the tractor from current tractor speed information and stored tractor speed information. According to another aspect of one embodiment of the invention, the method further includes storing previous tractor stop times and speed information at the related stop times in memory in the tractor controller and predicting the predetermined time based on the stored previous tractor stop times and speed information at the related stop times and current speed information.

According to another aspect of one embodiment of the invention, initiating the net wrapping sequence by the baler controller further includes initiating the net wrapping sequence at a fixed time from the initiation of the tractor stop sequence by the tractor controller. According to another aspect of one embodiment of the invention, the method further includes varying deceleration of the tractor by the tractor controller so that tractor speed is 0 mph at approximately the same time that wrapping the bale in the bale chamber begins.

According to another aspect of one embodiment of the invention, the method further includes restarting the tractor by the tractor controller after the bale in the bale chamber is wrapped. The tractor controller selects a gear to achieve a same speed of the tractor before the tractor controller initiated the stopping sequence. The tractor controller factors a total engine load, an engine load torque fraction, a load torque, and a maximum engine torque of engine rpm for restart, and wherein the tractor controller calculates the available torque from a difference between maximum engine torque for engine rpm at restart and a total engine load minus an engine load torque fraction to select the gear.

According to another aspect of one embodiment of the invention, the method further includes restarting the tractor by the tractor controller after the bale in the bale chamber is wrapped after an operator activates a start command device. The tractor controller selects a gear to reach a desired speed from a target speed at current engine rpm and selects lower gears to achieve the target speed before adjusting transmission gears and engine rpm to reach the desired speed. According to another aspect of one embodiment of the invention, the method further includes requesting permission from the operator by the tractor controller before restarting the tractor.

According to another aspect of one embodiment of the invention, the stop command device is a brake switch. According to another aspect of one embodiment of the invention, initiating at the tractor controller a stop sequence includes automatically shifting a tractor transmission to neutral and engaging tractor breaks.

According to another aspect of one embodiment of the invention, the method further includes activating a stop command device by the operator to initiate a resume travel command to the tractor controller after wrapping the bale in the bale chamber at a particular time after the net wrapping sequence is initiated by the baler controller. The method further includes receiving the resume travel command at the tractor controller from the stop command device and initiating at the tractor controller a resume travel sequence to resume travel of the tractor after receiving the resume travel command. Initiating at the tractor controller a resume travel sequence includes automatically shifting the tractor transmission to drive and disengaging the breaks.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

The problems in the prior art have motivated the creation of a tractor and baler combination and methods to automate tractor stopping and baler wrapping processes while providing for operator interaction during the automated stopping and wrapping sequence. Other embodiments of the invention improve the efficiency of the wrapping process by synchronizing tractor stopping with baler wrapping initiation to cut down lag time after the tractor stops, or approximately approaches stop, up until the beginning of wrapping being placed on a completed bale inside the bale chamber of the baler.

Figure 1:
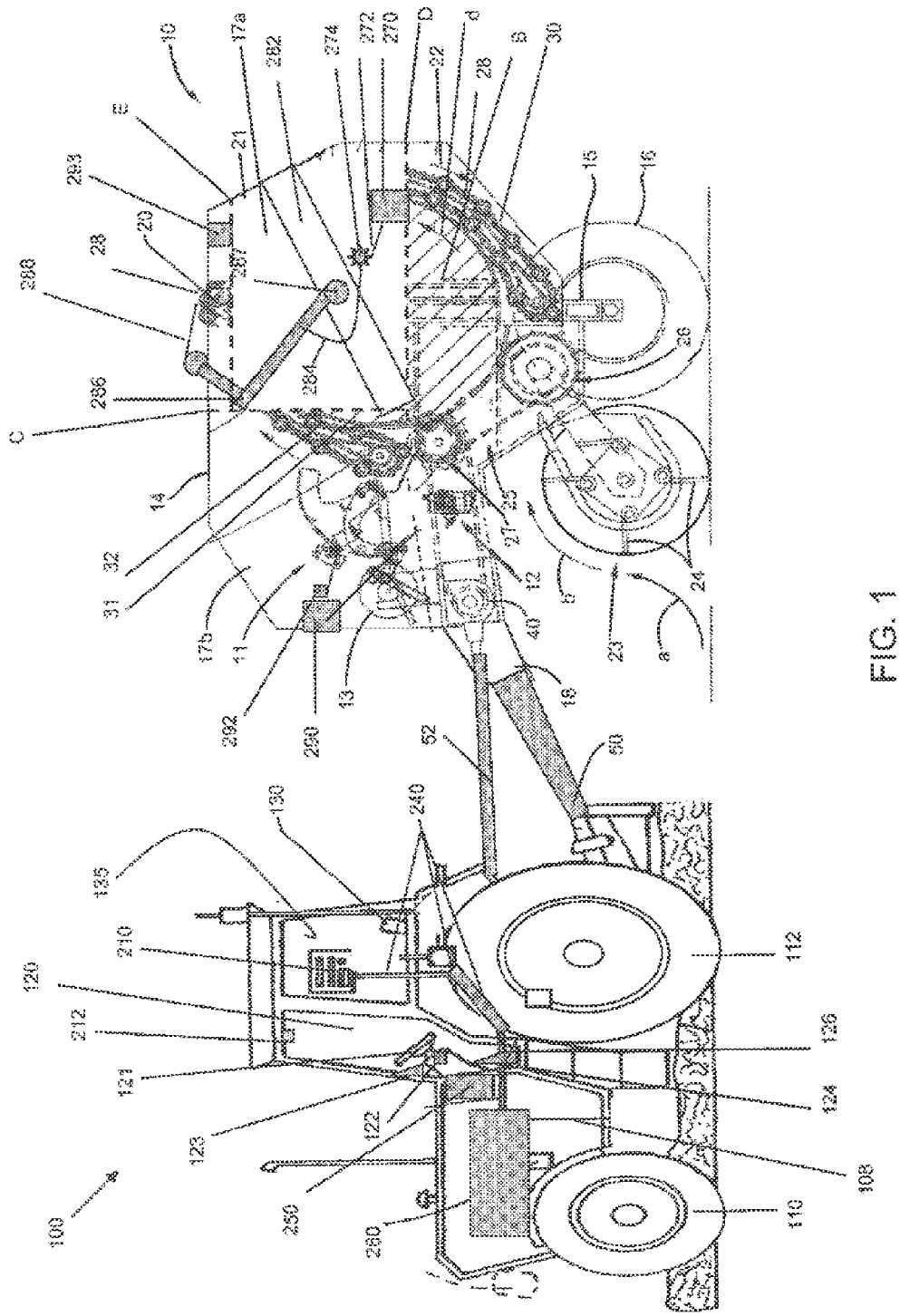
FIG. 1 shows a side view of a combination tractor and baler.

FIG. 1 illustrates a side view of an agricultural round baler 10 pulled by a tractor 100, in which embodiments of the present invention may be employed. Round balers are configured to pickup and bale crop material in a field. Crop in the field is usually arranged in a windrow as it is engaged by a baler 10 being pulled along a windrow of cut crop material by a tractor 100.

FIG. 1 shows a fixed chamber round baler 10 having a wrapping system for wrapping a cylindrical package of crop material formed in the round baler 10. The wrapping system of baler 10 comprises a net dispensing assembly 11 and a cutting assembly 12 for cutting web material, such as netting, issued from a supply roll 13.

As shown, round baler 10 includes a main frame 14 with a main support beam 15 on which a pair of wheels 16 (only one shown) are rotatably affixed. The main frame includes a pair of side walls between which a cylindrical bale forming chamber extends. For the purposes of clarity aft side wall 17b is shown in FIG. 1 and the elements mounted inwardly thereof are shown in full lines for clarity, which is an approach not uncommon in the descriptions in patents. A portion of foreground side wall 17a is shown between dashed lines C, D, and E for the purpose of showing bale size sensing devices housed external to the bale chamber outside side wall 17a. A portion of the bale chamber is still shown below dash line D. For illustrative purposes reference letter B is used to designate a bale, shown as the cross section in the chamber, where in only a portion of the cylindrical bale B is shown below foreground side wall 17a.

Baler 10 also includes a tongue 18 extending from the forward portion of main frame 14 for conventional connection to a tractor 100. Pivotally connected to the sidewalls of main frame 14 by a pair of stub shafts (not shown) is tailgate 21 which may be closed during bale formation, as shown in FIG. 1, or pivoted open about stub shaft 20 to discharge a completed bale out the back of the baler 10 in the opposite direction of the tractor 100. The tailgate includes tailgate walls 22 coextensive with side walls 17a and 17b. A pickup assembly 23 mounted on main frame 14 in a suitable manner includes a plurality of fingers or tines 24 moveable in a predetermined path to lift crop material from the ground, generally depicted by direction arrow a, and deliver it rearward in direction arrow b toward a transverse inlet 25 in the chamber defined by a floor roll 26 and a transverse stripper roll 27, both of which rolls are rotatably supported on mainframe 14 between sidewalls 17a and 17b.

FIG. 1 shows a portion of the bale forming chamber behind external wall 17a. As shown, the bale forming chamber is defined primarily by a round apron assembly 28 comprising a pair of support chains 30 mounted to travel along a continuous path, the inner run of which is defined on sidewalls 17a and 17b and tailgate walls 22 by front and rear sections 31 and 32 of a continuous chain guide track that separates at a point of track adjacent the stub shaft 20 during bale discharge. Floor roll 26 receives bale material at its forward surface, moving the bale material upward and rearward, clockwise as shown in FIG. 1. Bale material leaves the floor roll 26 and enters the bale chamber which rotates moving the bale material from a lower position, rearward and upward in a circular motion, counterclockwise as shown in FIG. 1 by arrow d. The bale grows within the bale chamber and the diameter of the bale B expands into the circumference of the round apron assembly 28.

When the bale B has achieved a desired size and density, wrapping is dispensed from net dispensing assembly 11 to ensure the bale maintains its shape and density. Cutting assembly 12 is utilized to cut the net once the bale has been wrapped. The wrapped bale may be ejected from the baler and onto the ground by raising the tailgate 21 of the baler connected to hydraulic lever (not shown). The tailgate is then closed and the cycle repeated as necessary and desired to manage the field of cut crop material.

FIG. 1 also shows an exemplary tractor for pulling the exemplary round baler described above. The tractor 100 pulls the round baler 10 by a hitch 50 coupled to the tongue 18 of the baler. The tractor 100 is also connected to the baler 10 by a power take off (PTO) shaft 52. The PTO shaft 52 is used for driving movable elements in the baler 10 from the engine of the tractor 100. As shown, tractor 100 includes a main frame 108 supported by steerable front wheels 110 and rotatably affixed rear wheels 112. A cabin 120 is supported by the main frame 108. The cabin 120 houses an operator seat 130 and operator controls. Operator controls in the cabin include a steering wheel 121 to turn the steerable front wheels 110, a clutch pedal 124, and brake pedal 126.

Operator controls also include a shuttle lever 122. The shuttle lever 122 can provide a constant tractor speed in the field. Shuttle levers are typically two types: momentary or three position. In a momentary shuttle lever, an operator will press the lever into one of three states, each of the states being forward, neutral, and reverse. The tractor will respond accordingly to the lever in the desired state. The lever will then immediately fall into a fourth state or centered position. Though the lever is in the centered position, the tractor will continue to drive according to the previous commanded state of forward, neutral, or reverse until the operator again presses the lever into one of the three driving state lever positions. With a three position shuttle lever, only three positions are available and the lever remains in the state set by the operator. In the up, or forward position, the shuttle lever is in drive and thus the tractor moves forward. In the middle, or centered position, the shuttle lever is in neutral. In the low, or aft position, the shuttle lever is in reverse and thus the tractor moves backward. In the three position shuttle lever, the lever remains in the one of three states and the tractor acts accordingly until the operator transitions the lever. Other exemplary tractors may include a gas pedal (not shown) in addition to the shift lever 122 to provide the operator varied speed control of the tractor. Other embodiments may use a joystick or gear shift lever which both engages forward/reverse/neutral and also selects the gear in the transmission instead of a shuttle lever. A hydrostatic vehicle, such as a combine or windrower may use a control handle or pedal that controls the displacement of the hydraulic pump and hence ground speed.

Other operator controls typically located to the right of a forward facing operator in the operator seat 130 in the cabin 120 include selectable transmission gear switching, power take-off switching, and torque settings for the PTO output (all not shown). Tractors may also include, as shown in FIG. 1, a display unit 123, and/or instrument cluster, providing for example the shuttle lever position and/or a speedometer.

FIG. 1 also shows interconnected controllers and sensors between the tractor 100 and baler 10. FIG. 1 shows an exemplary bale sensor 274 mounted to the outside of the baler on foreground sidewall 17a. In this example, the sensor is a rotary potentiometer. Bracket 282 is also mounted to baler foreground sidewall 17a externally. A serpentine arm 286 is pivotally connected to the bracket 282 at pivot connection 287. The opposing end of the serpentine arm 286 is connected by an apron connection link 288 to the top of the apron 28 partially shown above foreground sidewall 17a. As the bale expands to a near complete stage, the apron expands and tension on the apron 28 acts on the serpentine arm 286 pivoting from pivot connection 287. The pivoting arm 287 pulls a chain 284 causing the bale sensor 274, in this example a rotary potentiometer, to rotate. The analogue value of the rotary potentiometer continuously changes as the serpentine arm 286 moves externally to the baler 10.

Further information regarding exemplary sensors that may be used with embodiments of the present invention can be found in U.S. Pat. No. 4,855,924, entitled "Round Baler with Continuous Bale Size Monitoring", which is assigned to the present assignee of the present application and which is incorporated herein by reference in its entirety.

Bale sensors 274, such as the rotary potentiometer shown in FIG. 1 are sufficient to sense the completion of a bale within the baler 10. Other sensors that may be used within the baler, include for example pressure sensors to measure pressure of the bale on the continuous chain guide track of the bale chamber apron 28. Strain gauges may also be used to measure the expansion of a generated bale in the baler 10. Other sensors may include torsion loading sensors to measure loading on components in the baler 10. Torque loading sensors may also be used on the same or other baler components. In other embodiments, sensors may include limit switches, such as hall effect sensors, reluctance sensors, IR sensors, or any other types of sensors to detect a condition that indicates the bale has reached a predetermined size.

Figure 2:
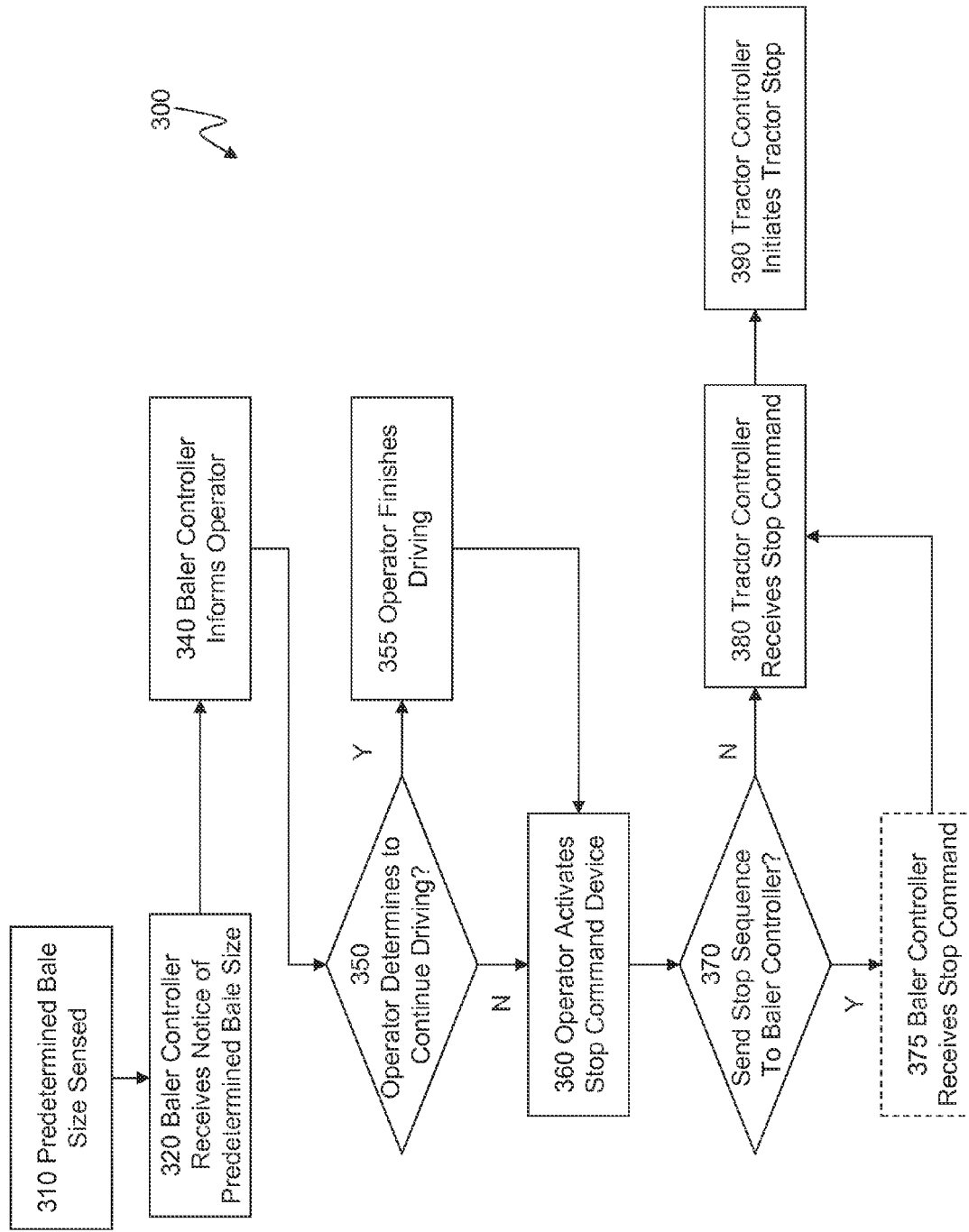
FIG. 2 shows a sequence for stopping a tractor prior to initiating a bale wrapping sequence.

Analogue signals from the sensors are either directly transmitted by the sensor to a baler controller 210 housed in the cabin 120 of the tractor 100 or relayed by a sensor relay unit 270, located elsewhere on the baler, as for example shown in FIG. 2 externally on foreground sidewall 17a of the baler 10 connected to sensor 274 by electrical path 272.

In some tractor and baler combinations, relay unit 270 transmits the sensor information to the baler controller 210 along electrical wiring in an analog or digital manner. In other tractor and baler combinations that relayed signal travels over a CAN-bus. The relay unit 270 may convert analogue or digital sensor signals for wireless transmission to the baler controller 210. The relay unit 270, shown in FIG. 1 transmits the sensed information at a predetermined frequency for reception at a receiver built into the baler controller 210.

In recent years, tractor and baling controls have been integrated within or in proximity to the cabin 120 of the tractor 100 to provide the operator with in-reach control of variable parts of the tractor-baler configuration. As shown in FIG. 1, baler controller 210 is attached to the inside of a foreground window 135 of the cabin 120. The baler controller 210 receives information about the current status of the baler configuration, as for example the size of a bale and bale wrapping processing information in the baler 10. As for example, in embodiments of the invention further described below, the baler controller 210 receives a signal when the bale has reached a predetermined size as sensed by the bale sensor 274. The baler may receive information about the size of the bale continuously or at particular events, for example bale completion, from sensors and or other communications devices on the baler via electrical wiring including analog, digital, or CAN-bus. In this particular example, as shown in FIG. 1, the baler controller 210 houses an integrated receiver to receive transmitted signal information over a specified frequency from the relay unit 270 on the baler 10. The relay unit 270 receives analogue or digital sensor signals and converts the information for wireless transmission to the baler controller 210.

As shown in FIG. 1, the baler controller 210 is connected to a tractor controller 250 via a CAN-bus 240. The tractor controller 250 is located approximately between an engine compartment housing the transmission system 260 and the display unit 123, located internally inside the cabin 120. In other tractors, the tractor controller 250 may be embedded elsewhere in the cabin 120, for example under the operator seat 130, or elsewhere inside mainframe 108 in proximity to the transmission system 260. In other tractors, multiple controllers may communicate over the CAN-bus 240 which may control one or more tractor functions.

Incorporated into the tractor cabin 120 for use in embodiments of the present invention is a tractor stop command device 212 so that an operator may initialize an auto-stop sequence in the tractor. In some embodiments, the tractor stop command device 212 may be connected to either tractor controller 250 or the baler controller 210 or both. Connection from the tractor stop command device 212 is electrical. The tractor stop command device 212 may be an electrical switch, button, lever, or any other electrical input application. The device may be located anywhere in the cabin 120 and in proximity to the operator of the tractor. The tractor stop command device 212 may also be located on the baler controller 210 or tractor controller 250 or any other operator interface on or in the tractor 100. The electrical connection or communication link from the tractor stop command device 212 may be across a CAN-bus. Additionally, a tractor restart device (not shown) may also be located in the cabin 120 so that an operator may initialize an auto restart sequence in the tractor 100, with the restart device having similar connections as the stop command device 212 in the tractor 100. In other embodiments of the invention, the stop and restart commands may come from the same shared device.

In some embodiments of the invention, either or both the baler controller 210 and tractor controller 250 provide for automatic control processes. Both controllers may include one or more microcomputers, microcontrollers, or processors including appropriate peripherals such as memory, power source, data buses, and other circuitry appropriate for carrying out controller functionality. Both controllers may use internal memory to store data (e.g. saved settings, recorded status information, configuration files, user profiles, etc) or instructions (e.g. applications, algorithms, or programs used in the operation of the present invention) for use during operation. Memory may be a local RAM, ROM, flash memory, hard drive, solid state storage, removable memory, or any combination or subset thereof.

In some embodiments of the invention, either or both controllers may access programming and data information from memory. This data may include information about the current configuration of the tractor and baler, user profile files, and more configuration files. The instructions obtained from memory may include information sufficient to make a determination regarding changes to the tractor speed, predicting future tractor speeds, predicting future tractor stop times, or baler wrapping and cutting start and stop times.

In many embodiments of the invention, baler controller 210 interacts with the operator of the tractor via an operator display interface. The baler controller 210, shown in FIG. 1, incorporates a display interface on the opposing side of the controller shown in FIG. 1, facing the operator. In other embodiments, the baler controller and display interface are separate and located in different locations within the cabin 120. In other embodiments, the baler controller 210 incorporates other visual display interfaces such as multicolor lights, or single color lights, text display boards, or picture displays to alert an operator of information pertaining to the tractor or baler or both. In other embodiments, the baler controller 210 incorporates other audio interfaces such as speakers to provide the operator with an audio tone, beep, chirp, or synthesized voice to alert an operator of information pertaining to tractor or the baler or both. The baler controller 210 interface may provide the operator with information pertaining to the size of the bale in the baler, whether the bale in the bale chamber has reached a predetermined size to begin wrapping the bale, net wrapping process information, and net cutting information. The interface also allows the controller to receive operator input so as to for example eject a bale or cut the net wrapping. The operator interface may include screens such as a CRT, LCD, LED, OLED, or AMOLED. The interface typically includes input devices such as buttons, keypads, touch screens, or the like. Baler controller interface allows for an operator to inject some manual implementation for net wrapping, net cutting, or bale ejection during the baling process.

In many embodiments of the invention, the interface between the tractor control unit 250 and the operator is through the display unit 123. The tractor control unit 250 provides the operator with speed and engine performance via the display unit 123. The tractor control unit 250 may obtain information pertaining to speed and engine performance from sensors (not shown) housed within the transmission system 260.

In many embodiments of the invention, either or both controllers can perform some form of automatic control over the baler 10 and/or tractor 100. For example, the baler controller 210 may automatically command cutting driver 292, housed in proximity to the cutting assembly 12 to cut netting after a bale is wrapped. In addition, the baler controller can automatically command a net dispenser motor 290 to drive the net dispenser 11 providing wrapping material onto a bale enclosed in the bale chamber. The baler controller 210 may also automatically command tailgate actuator 293 to drive the tailgate 21 up to allow for a completed bale to eject and then to close. In other balers 10, the tailgate 21 may be normally opened and then closed by the tailgate actuator 293. The tractor controller 250 may automatically slow down or speed up a tractor by adjusting components of the transmission system 260. The tractor controller 250 can apply braking, engage and disengage engine/transmission clutches, and change gearing. Some embodiments of the invention are described in reference to FIG. 9 and FIG. 10 below for the tractor controller 250 to automatically stop and hold a tractor still and to automatically restart a tractor from the stopped position.

In some conventional tractors, tractor stopping has been fully automated so that a tractor automatically stops when a full bale is sensed in the baler or when the wrapping cycle has begun. Though these features may provide an operator with less manual workload responsibility, they disconnect the operator from the tractor stopping process and baling initiation process potentially causing problems and slowing down operations. Without some form of operator interaction allowed in automated tractor stopping and baling, an operator might not completely achieve the scheduled crop pickup the operator had intended in a particular amount of time due to the automated processes beginning when the operator least intended it to begin. Also, as in some embodiments of the invention, by introducing the operator into the automated process, as for example to initiate the stop sequence, the operator can determine whether to drive on and pick up any additional crop material even after being informed that the bale has reached a predetermined size in the bale chamber. For example, the operator may notice only a small amount of arranged windrow in front of the tractor and decide to finish picking up the windrow before commencing an automated stop sequence. Also, without modification to existing automated stop and baling functions, the wrapping sequence would likely begin before the tractor comes to a complete stop. Thus, additional crop picked up in the baler with the wrapping process already begun will result in crop material being bound outside the wrapping. Additional wrap would need to be applied, wasting wrapping resources, to further secure extra crop material bound to the already wrapped bale. The following embodiments of the invention consider these circumstances and resolve these issues.

FIG. 2 shows a sequence for stopping a tractor prior to initiating a bale wrapping sequence in at least one embodiment of the present invention. Method 300 utilizes bale sense data to inform an operator to stop the tractor and initiate a stop.

At step 310, bale controller 210 receives sensed data from one or more bale sensors 274 in the baler 10, as for example relayed by the relay unit 270, with regards to bale size. In this embodiment, the bale sensors 274 sense when the bale has surpassed a predetermined bale size, wherein the bale is at a size sufficient for wrapping and then ejection. The various types of sensors that may be used in the present embodiment are described above in relation to FIG. 1.

At step 320, in this embodiment of the invention, the baler controller 210, receives information from the one or more bale sensors 274 that a predetermined bale size has been reached and that the bale is at a sufficient size for wrapping then ejection. In other embodiments of the invention, the one or more bale sensors 274 send a discrete signal to the bale controller 210 signaling that the bale is at the predetermined size. In other embodiments, bale controller 210 will determine whether sensed information pertaining to bale size means a predetermined size has been reached. The bale controller 210 may be configured such that the baling capacity of the baler 10 is preprogrammed and stored in memory on the bale controller 210. In other embodiments of the invention, the operator might simply configure the bale controller 210 with a predetermined size through the bale controller interface. In other embodiments, the operator may inform the bale controller 210 of the type of crop material or the width and height of the windrow. The bale controller 210 could then calculate the projected remaining capacity of the baler as sensed data is received at the bale controller 210 and thus set the predetermined size. In other embodiments, the bale controller 210 might simply pass on a value from the one or more bale sensors 274 so that the operator might be informed of the bale size.

In this and other embodiments of the invention, after the bale has reached a predetermined size and the baler controller 210 has received the information, the baler controller 210 informs the operator that the predetermined size has been reached in step 340. In some embodiments of the invention, the signal may be an audible alarm, such as a beep, chirp, or ring. In other embodiments of the invention, the baler controller 210 might provide a computer generated voice update, informing the operator that the predetermined size as been reached. In other embodiments of the invention, the baler controller 210 may inform the operator through visual cues or a visual alarm. In some embodiments of the invention, certain colored glass bulbs would illuminate to reflect that the predetermined size has been reached. In other embodiments of the invention, a bulb or LED would blink or strobe to alarm the operator. In other embodiments of the invention, text or a graphical icon or graphical symbol would display on a graphical interface to inform the operator.

After the operator has been notified by the baler controller 210 that a predetermined size of the bale as been reached, the operator determines whether to continue to drive the tractor in step 350. Though the operator has been informed that the predetermined size has been reached, the operator may want to continue to operate the tractor 100. For example, the operator may see that only a small amount of windrow is lined ahead of the tractor 100. The operator might determine to then continue driving and baling the windrow beyond the predetermined bale size so as to finish picking up the remaining windrow. As another example, the operator may want to continue driving based on the conditions of the field and the location of the tractor 100 in the field. For example, the operator might want to drive the tractor 100 beyond a slide slope or out of a wet area in the field. If the operator chooses to continue driving, then the operator finishes driving the tractor 100 in step 355.

When the operator finishes driving in step 355 or has determined to stop driving in step 350, then the operator activates a stop command device 212 in step 360 to initiate automatic stopping of the tractor. In the present embodiment of the invention, the stop command device 212 is located in the cabin 120. The stop command device 212 may be located near the steering wheel 121, on the baler controller 210, on the tractor controller 250, or in any other accessible location to the operator. For example, the device 212 may simply be a button on the baler controller 210 labeled as "tractor stop". The stop command device 212 may also be the shuttle lever 122, activated when the lever is moved in a certain order to various positions. Other variable types of stop command devices 212 and locations are described in reference to FIG. 1 above.

As shown in FIG. 2, step 370 is a decision step for where to send the operator initiated stop command signal from the stop command device 212 in step 360. If the stop command device 212 is connected to the baler controller 210, and not the tractor controller 250, then the initiated stop sequence is received by the baler controller 210 in step 375. If the stop command device 212 is connected to the tractor controller 250, then the stop sequence signal is transmitted to the tractor controller as shown in step 380. If the baler controller 210 receives the command, in step 375, then the baler controller 210 subsequently relays the command to the tractor controller 250 in step 380. The baler controller 210 may send the relay along a communication link, as for example in this embodiment across the CAN-bus 240. In some embodiments of the invention, wherein the tractor controller 250 and baler controller 210 are integrated in an ISOBUS system, then the two would communicate on the ISOBUS network.

At step 390, following the tractor controller 250 receiving the stop command in step 380, the tractor controller 250 initiates an automatic stop of the tractor. In some embodiments of the invention, the tractor controller 250 sends an analog or digital electronic signal to an electronic braking system in the tractor. In other embodiments of the invention, the tractor controller 250 electrically commands a hydraulic actuator to apply a down force on the brake pedal 126. In some embodiments, the transmission may be placed in neutral in conjunction with actuating the brakes to bring the tractor 100 to stop without stalling the engine. In other embodiments of the invention, the tractor controller 250 commands engine braking and utilizes clutches housed in the transmission system 260 to bring the tractor 100 to stop. In an example embodiment of the invention the tractor controller 250 alters the transmission system 260 to stop and subsequently restart the tractor shown below in FIG. 9 and FIG. 10.

Figure 3:
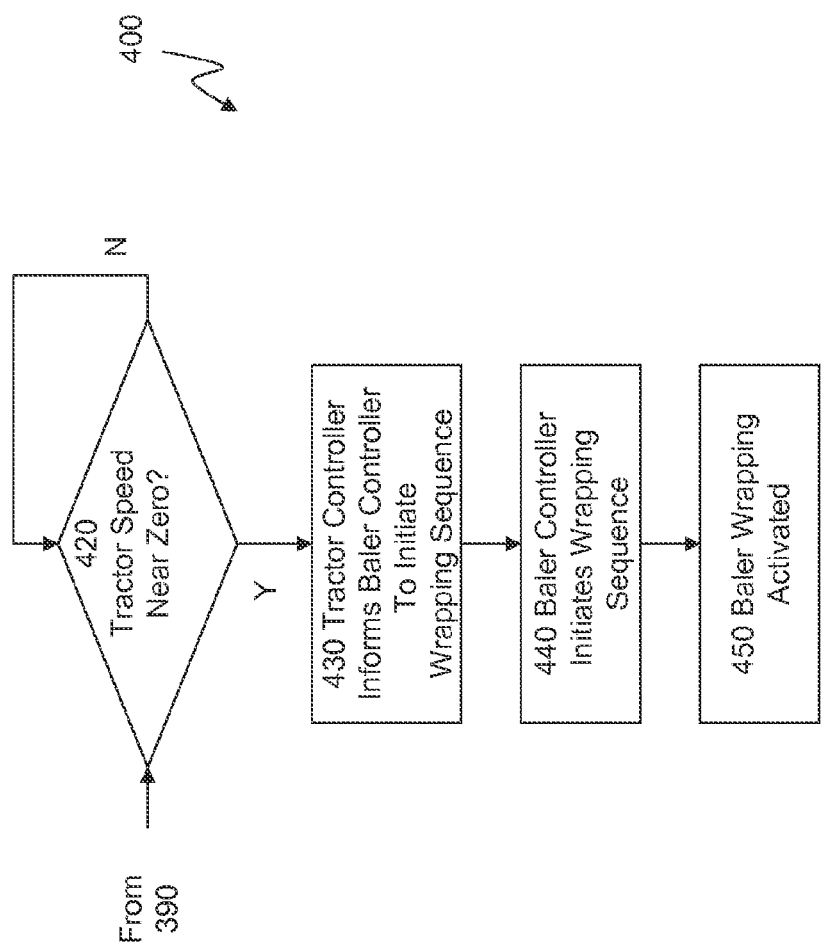
FIG. 3 shows a sequence of wrapping a bale after initiating the tractor stop sequence shown in FIG. 2.

FIG. 3 shows a sequence of wrapping a bale in at least one embodiment of the present invention following the sequence of initiating a tractor stop in FIG. 2. Method 400 utilizes tractor speed sense data for when a tractor has reached a predetermined speed to then initiate bale wrapping in the baler 10.

As shown in step 420, the tractor controller 250, through feedback from tractor speed sensors determines whether the speed of the tractor is approximately 0 mph. Tractor speed sensors may include wheel speed sensors or radar ground sensors. In other embodiments of the the tractor controller 250 is connected or integrated with, as for example in ISO-BUS, a mounted GPS unit. A GPS unit calculating speed of the tractor can forward the analog or digital speed information to the tractor controller 250. In some embodiments of the invention, the speed of the tractor is electronically forwarded from the tractor controller 250 to the display unit 123 so the operator can see the speed. In other embodiments of the invention, the tractor controller determines whether the decelerating tractor speed has crossed a deadband value at or around 0 mph. For instance, in some embodiments of the invention, the deadband value is +/−0.15 mph. In other embodiments, the deadband value may be set and/or adjusted by the operator. Other deadband values may be incorporated in various embodiments of the invention. When the deadband value is achieved or crossed, or in some embodiments of the invention the speed is 0 mph, the tractor controller 250 informs the baler controller 210 to initiate the wrapping sequence in step 430. Otherwise, the tractor controller 250 continues to monitor the tractor speed until a zero value, or in some embodiments of the invention a dead band around 0 mph, is reached.

At step 430, in this embodiment of the invention, the tractor controller 250 informs the baler controller 210 that the baler controller 210 can initiate the wrapping sequence of the bale in the baler 10. In other embodiments of the invention, the tractor controller 250 may provide the baler controller 210 with information pertaining to the zero speed or value approximately near zero speed for the bale controller 210 to determine when to initiate the bale wrapping. Subsequent to receiving the information from the tractor controller 250, the baler controller 210 initiates a wrapping sequence in the baler 10 at step 440, sending a command to the wrapping drive system 290 in the baler 10. At some time after the baler controller 210 initiates the sequence, baler wrapping is activated in step 450 wherein the wrapping drive system 290, in this embodiment of the invention, automatically begins applying wrapping from a net roll onto the bale in the bale chamber of the baler 10. In this embodiment of the invention, the wrapping of a bale does not begin until the tractor has either stopped or achieved a speed value approximately near stop or 0 mph. By synchronizing the tractor stop with bale wrapping initialization, any essential downtime in baling productivity is further minimized.

Figure 4:
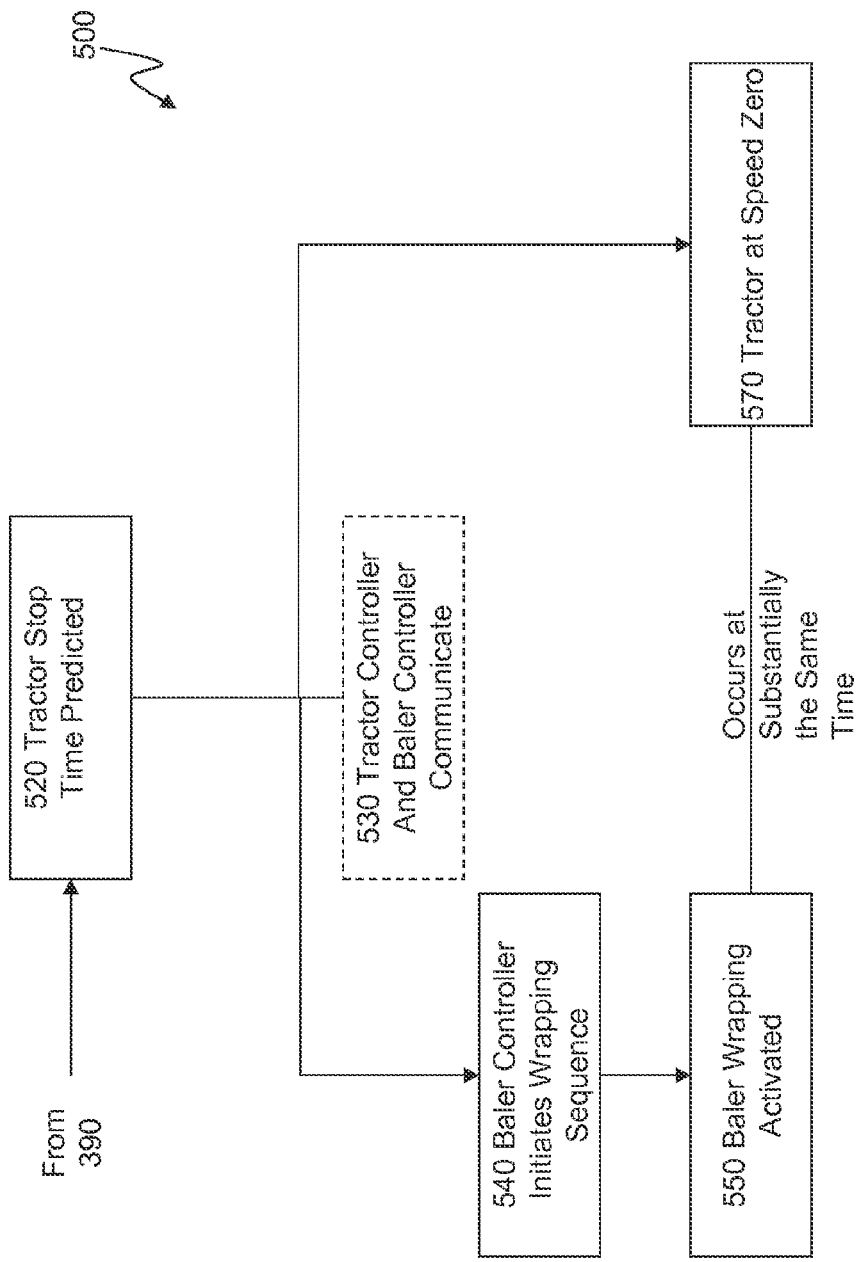
FIG. 4 shows an alternative sequence of wrapping a bale after initiating a tractor stop sequence shown in FIG. 2.

FIG. 4 shows an alternative sequence of wrapping a bale in at least one other embodiment of the present invention following the sequence of initiating a tractor stop in FIG. 2. Method 500 utilizes tractor speed sense data to determine when baler wrapping should begin so that baler wrapping occurs approximately at the same time the tractor 100 stops. The wrapping system may take approximately one to two seconds to begin active bale wrapping after receiving a command signal from a baler controller 210. In other balers, the time between a command sent from the baler controller 210 and the wrapping beginning in the baler 10 may be longer or shorter. To conserve time and improve the efficiency of baling in relation to tractor motoring, the following steps shown in FIG. 4, and steps alternatively shown in FIG. 5, serve to accomplish a tractor stopping still and the beginning of active wrapping occurring at approximately the same time.

After the tractor controller 250 initiates the tractor 100 to stop in step 390, a predicted stop time for the tractor 100 is determined as shown in step 520. The stop time is the time from the initialization of the stop sequence from the tractor controller 250 in step 390 until the tractor speed is measured at 0 mph, or within a deadband value approximate to 0 mph. For example in some embodiments of the invention, a tractor speed within a deadband value of +/− 0.15 mph signifies that the tractor has stopped. In some embodiments of the invention, the tractor controller 250, housing a processor will calculate the stopping time of the tractor 100 from the time the stop sequence was initiated in step 390. In some embodiments of the invention, sensors located in or around the tractor transmission system 260 provide sensed speed of the tractor continuously to the tractor controller 250. In other embodiments of the invention, the sensors provide at least one sensed speed value at or approximate to the time the tractor controller 250 initiates the tractor stop sequence in step 390. In other embodiments of the invention, the baler controller 210 may calculate the predicted stop time of the tractor 100. In some embodiments of the invention where the baler controller 210 calculates the predicted stop time, the tractor controller 250 will pass speed information obtained by the transmission speed sensors to the baler controller 210 either continuously or at least at or around the time the tractor controller 250 informs the baler controller 210 that the stop sequence was initiated in step 390. In other embodiments of the invention, a GPS unit, or any other alternative processing device connected by CAN-bus or ISOBUS, will calculate the predicted stop time of the tractor 100 and relay the information back to the tractor controller 250 or baler controller 210.

The predicted stop time of the tractor 100 may be calculated by the tractor controller 250 or bale controller 210 by various means. In one embodiment of the invention, the stopping time may be predicted from the measured deceleration rate and current sensed speed of the tractor 100. In another embodiment of the invention, a predicted stopping time may be calculated based on previous stop times when the tractor stop sequence was initiated at similar speeds. In some embodiments of the invention, either controller calculating the predicted stop time, may utilize its internal memory. Memory would store information pertaining to initiated stop sequence times and the sensed tractor speed at the initiated stop sequence time. Memory would also store the time the tractor 100 actually stopped moving at or approximately near 0 mph. Memory would also store calculated differences between the initiated stop sequence time and actual tractor stop time. The controller, with speed and times stored in memory, may retrieve stored speed and time information and compare with sensed speed presently received by the tractor controller 250 when the tractor controller 250 initiated the tractor stop in step 390. If the sensed speed matches exactly or approximate to stored speed in memory, the tractor controller 250 or baler controller 210, can predict the stopping time of the tractor 100 based on the time differences previously calculated and stored in either controller's memory.

Once a tractor stop time is predicted in step 520, the baler controller 210 subsequently initiates a wrapping sequence in step 540. The wrapping sequence is initiated at a fixed time after the tractor controller 250 initiates the stop sequence in step 390 or after the tractor stop time is predicted in step 520. In other embodiments of the invention, the baler controller 210 may calculate when the baler controller 210 should initiate the wrapping sequence based on the predicted stop time. In some embodiments of the invention, the bale wrapper start time is calculated to ensure that the bale wrapper activation and tractor stop are achieved synchronously. When the tractor stop time is calculated by the baler controller 210, or calculated and forwarded to the baler controller 210 from the tractor controller 250, the baler controller 210 utilizes the predicted stop time to determine baler wrapping activation initiation. Information stored in memory of the baler controller 210 may contain the time difference between a baler controller 210 initiating a wrapping sequence and the wrapping sequence actually beginning. In some embodiments of the invention, this information, used with the tractor predicted stop time, is utilized by a processor in the baler controller 210 to determine the time at which the baler controller 210 will initiate the wrapping sequence so that the baler wrapping activation and tractor stop occur at the same time.

Shown in step 530 at any time prior to, during, or following the prediction of a tractor stop time in step 520, the tractor controller 250 and baler controller 210 may communicate information about timing of tractor stop, tractor speed, timing of bale wrapping, or any other information to achieve an activated bale wrapping to occur at the same time the tractor 100 reaches a speed at or approximate to 0 mph. In some embodiments of the invention, the controllers may communicate one or more times when either the tractor stop time is predicted, the baler wrapper start time is predicted, or at anytime after and up until activation of baler wrapping and tractor stopping occurs.

Subsequent to initiating the wrapping sequence, baler wrapping is activated and begins in step 550. Bale wrapping begins at the same time or approximate to the time the tractor comes to a stop, at or approximate at 0 mph, in step 570.

Figure 5:
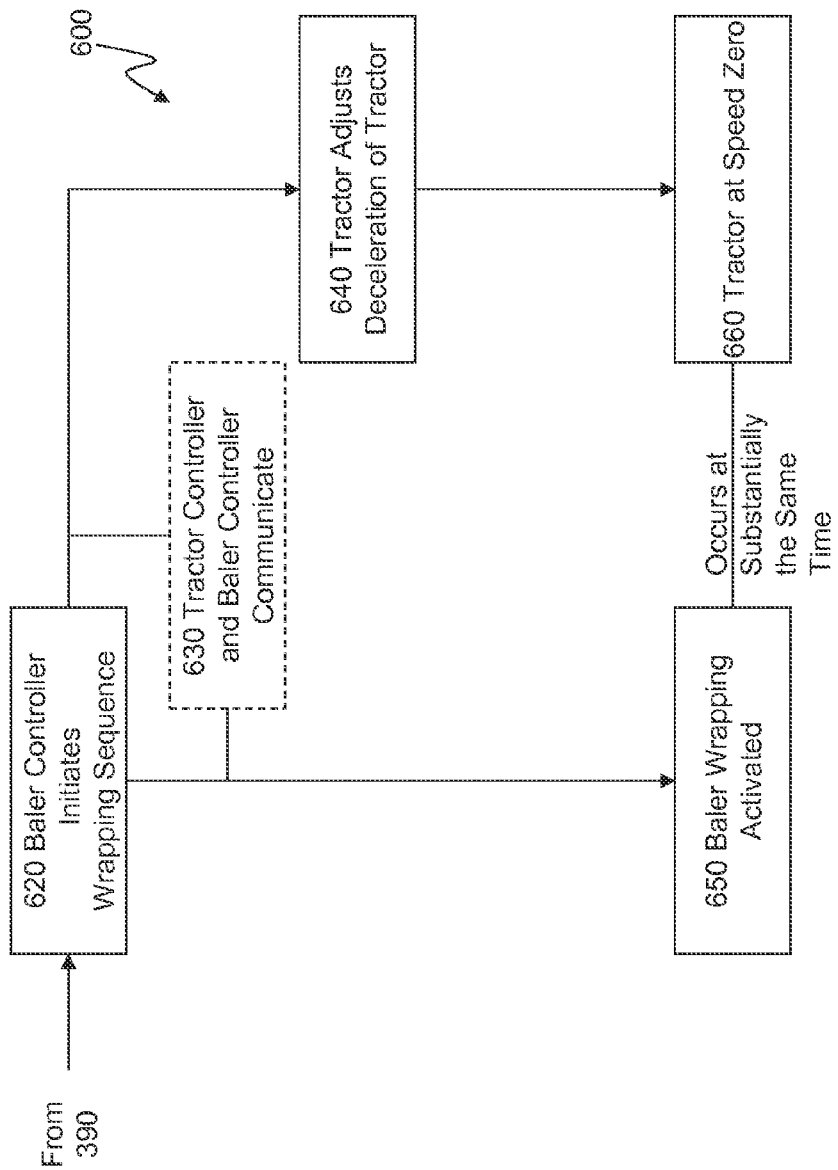
FIG. 5 shows a sequence for modifying tractor deceleration and wrapping a bale after initiating a tractor stop sequence shown in FIG. 2.

FIG. 5 shows a sequence of wrapping a bale in at least one other embodiment of the present invention following the sequence of stopping a tractor in FIG. 2. Method 600 utilizes tractor speed sense data to regulate tractor speed so that baler wrapping occurs approximately at the same time the tractor stops.

At some fixed time after the tractor controller 250 initiates a tractor stop sequence in step 390, the baler controller 210 initiates the wrapping sequence in the baler 10 at step 620. At some fixed time after the baler 10 controller initiates the wrapping sequence, baler wrapping begins inside the baler at step 650.

As shown in step 630, at any time prior to, during, or after initiating the wrapping sequence in step 620, the tractor controller 250 and baler controller 210 may communicate with each other. At step 630, in some embodiments of the invention, the baler controller 210 will inform the tractor controller 250 that the bale wrapping was initiated in step 620. In other embodiments of the invention, the baler controller 210 may also inform the tractor controller 250 of the time difference, stored in bale controller memory for previous baling processing, between a baler initiated wrapping start sequence in step 620 and the start of the wrapping activation in the baler in step 650. In other embodiments of the invention, the tractor controller 250 may store time difference information pertaining to baler wrapping processing in tractor controller memory. The tractor controller 250 may store the time difference between a tractor initiated stop in step 390 and baler controller initiation of wrapping start in step 620. The tractor controller 250 may also store the time difference between the baler controller 210 initiated wrapping start in step 620 and the beginning of the wrapping activation at step 650.

The tractor controller 250 then utilizes information pertaining to tractor stop and/or wrapping sequence timing to adjust the deceleration of the tractor in step 640. In some embodiments of the invention, the tractor controller 250 will adjust gearing in the transmission system 260 to fluctuate deceleration based on continuously sensed speed forwarded from sensors in or approximate to the transmission system 260 to the tractor controller 250. In other embodiments of the invention, the tractor controller 250 will adjust or modify tractor engine or transmission clutches and gears and or tractor braking to modify tractor deceleration. The tractor controller 250 determines the preferable rate of deceleration from the sensed speed to accurately stop the tractor at or approximate to the start of baler wrapping activation in step 650. When the preferred rate of deceleration is achieved, the tractor stops at or approximate to 0 mph in step 660, synchronizing with the beginning of baler activation in step 650.

Figure 6:
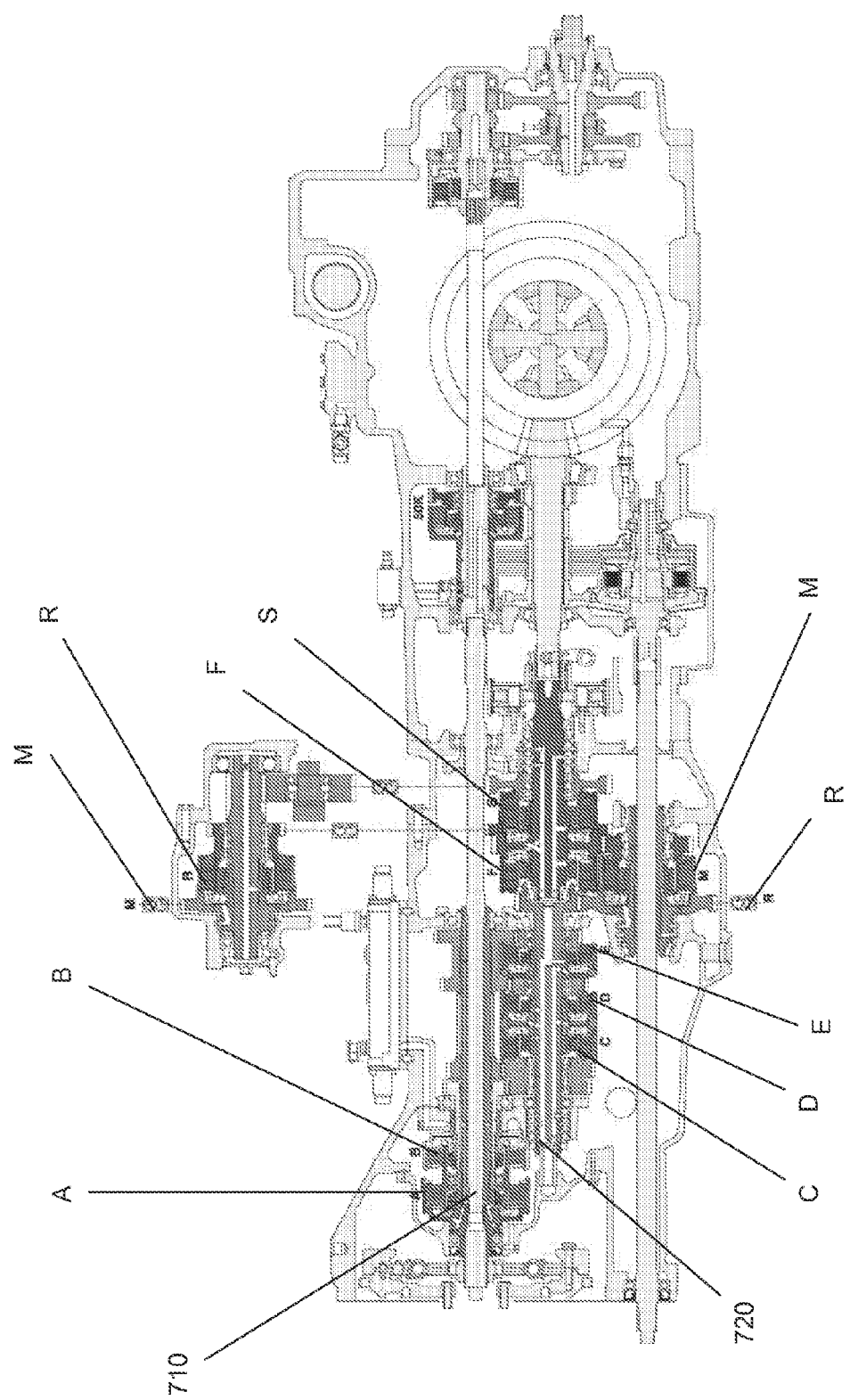
FIG. 6 illustrates a schematic of a tractor powershift transmission system for automatically stopping and restarting a tractor.

FIG. 6 shows a schematic of a powershift transmission system that may be utilized in embodiments of the invention for stopping and restarting a tractor. Manual operator stopping of a tractor requires an operator to press the clutch pedal, putting the tractor in neutral, and then pressing the brake pedal at the same time. The tractor restarts, after for example a bale is deployed, when the operator removes his foot from the brake and clutch pedals so that the tractor resumes forward motion in full travel. Other tractors incorporate continuously variable transmission systems and electronic braking to implement automatic stopping of a tractor. However, methods for automatically stopping and starting a tractor are needed for tractors that fail to implement any electronic braking architecture or continuously variable transmission (CVT) systems to relieve the operator of having to manually stop, manually maintain the tractor in a standing still position, and manually restart the tractor 100 during baling. The embodiments of the invention described below realize these needed methods.

Within the tractor stop and baling initiation sequence, as described in the embodiments of the invention above, and in other tractor functions utilizing various ISOBUS integration systems, it may be required or desired by an operator and the industry that a tractor follow a particular speed set point coming from the implement, including when the set point is of zero value or at stop while ensuring the following: that the tractor 100 stops properly when a zero speed is received; that the tractor 100 remains standing still when the engines are running even though brakes are not engaged (exercising only transmission clutches); that the tractor 100 restarts when the implement requires a speed set point greater than zero so as to be fast enough to continue the tractor 100 forward speed approximating the speed just prior to stopping the tractor to wrap a bale, but without killing the engine due to the load; and for safety, that the tractor 100 restart is subject to an operator's acknowledgement.

Figure 9:
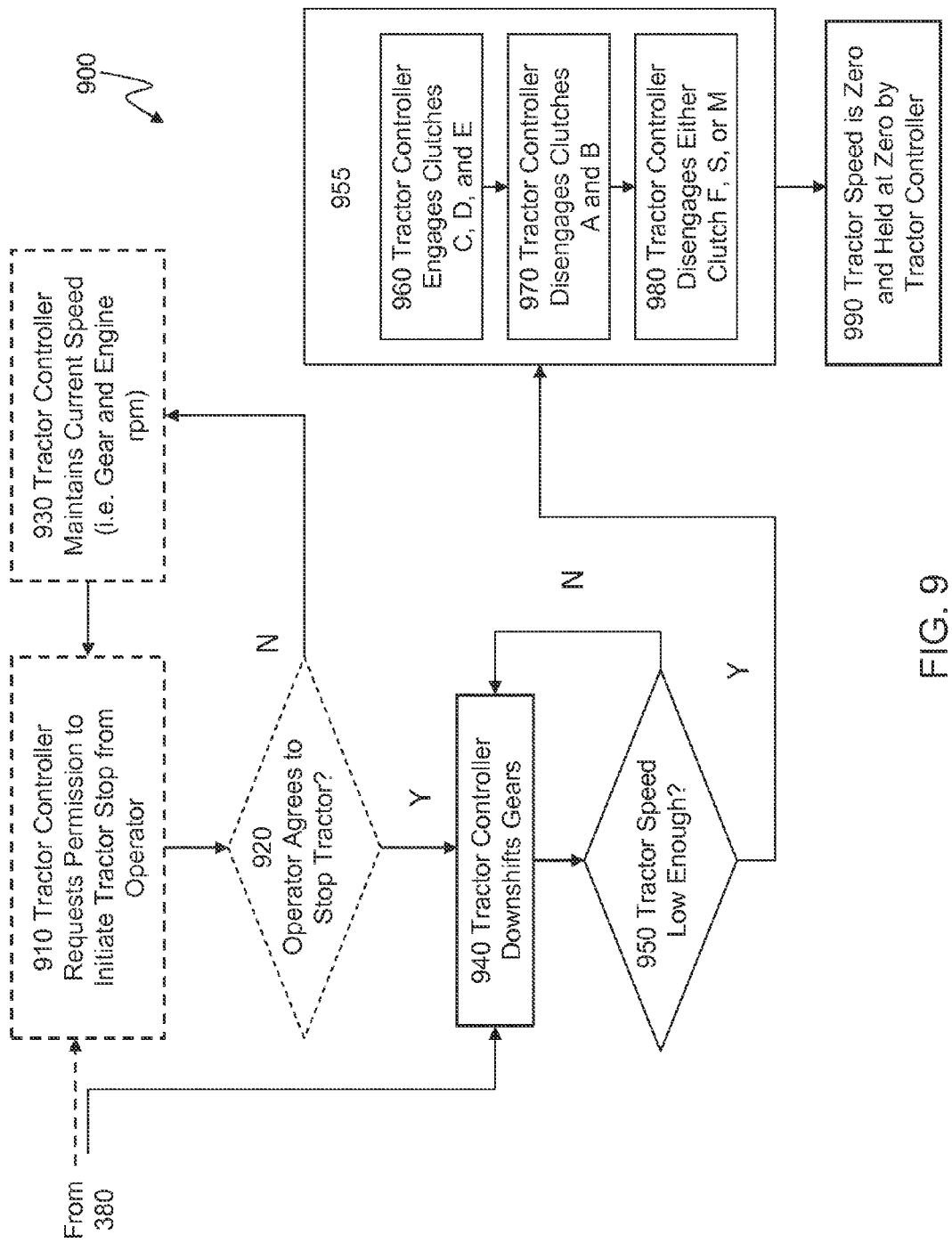
FIG. 9 shows a tractor stopping sequence conducted by a tractor controller on a tractor transmission system.
Figure 10:
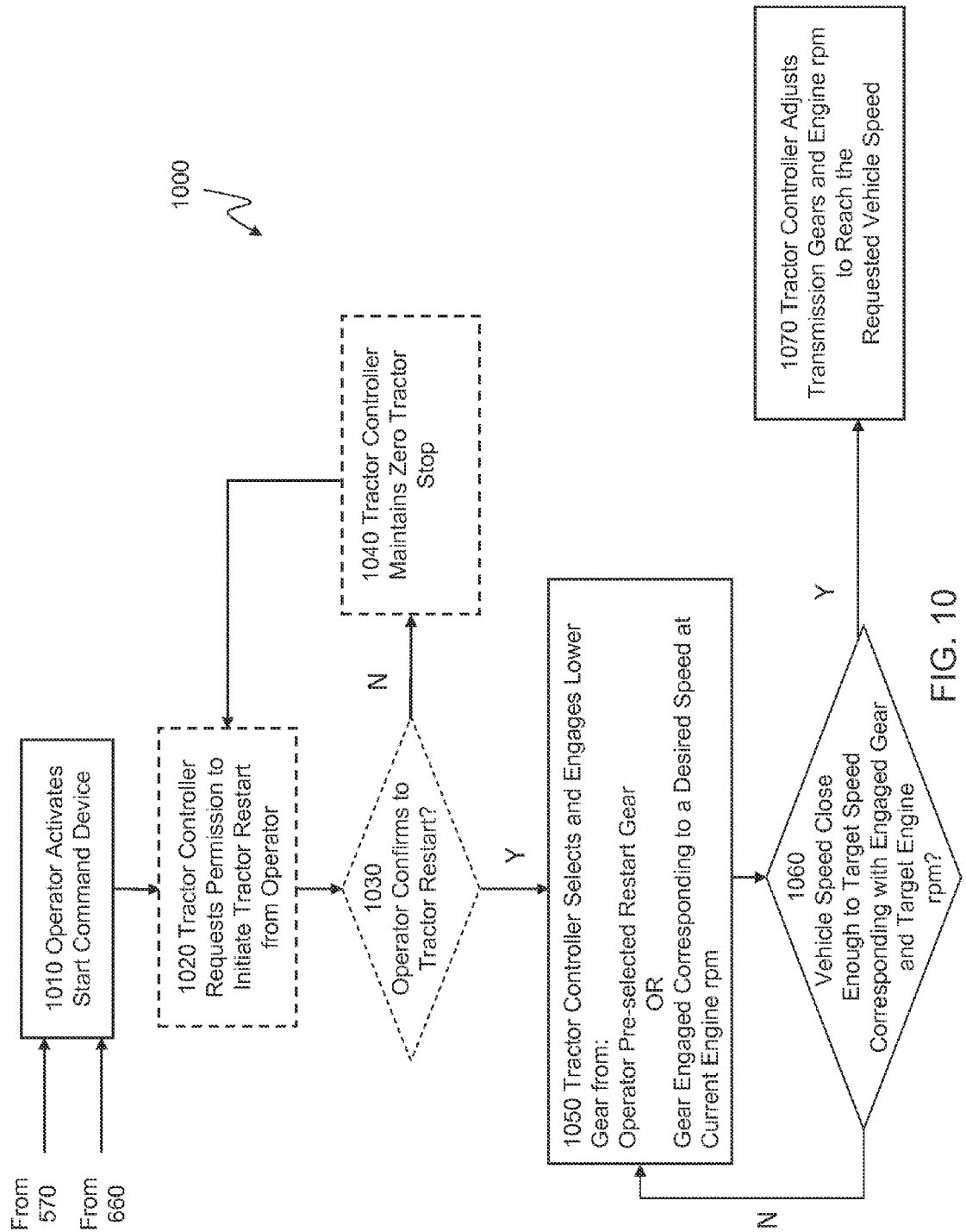
FIG. 10 shows a tractor restarting sequence conducted by a tractor controller on a tractor transmission system.

The exemplary powershift transmission system, shown in FIG. 6, is automatically operated by the tractor controller 250 to stop the tractor, hold the tractor firmly standing still, as for example on slopes, and restart the tractor in proper gear to continue tractor travel forward at a high speed without killing the engine as further described in sequences shown in FIGS. 9 and 10.

FIG. 9 shows a tractor stopping sequence conducted by the tractor controller 250 for a tractor transmission system 260 in at least one embodiment of the present invention. Method 900 shown in FIG. 9, incorporates the tractor controller 250 to engage and disengage clutches located on the tractor transmission system 260 to stop and hold a tractor standing still, with the engine running, and the brakes not applied. Clutches labeled in FIG. 6 are engaged and disengaged within the method shown in FIG. 9.

Method 900 may be considered a detailed exemplary embodiment of step 390 in FIG. 2. Thus, method 900 begins with a stop command received by the tractor controller in step 380. The tractor controller 250 may receive a zero speed request signal from the operator via the stop command device 212. Tractors having a three position shuttle lever, a forward moving tractor transitions to a zero speed by the tractor controller 250 after the operator shifts the lever from the forward position to the reverse position in a forward-reverse shuttling operation. In other embodiments of the invention, the operator may depress a button of the stop command device 212, as for example in step 360 of FIG. 3, to command the tractor controller 250 to initiate the stop condition. In some embodiments of the invention, the operator may shift the shuttle lever 122 back to the forward position to inform the tractor controller 250 to initiate tractor stop. In other embodiments of the invention, the operator may depress a button to inform the tractor controller 250 that a trigger is armed, wherein the operator next shifts the shuttle lever 122 to the forward position to trigger the tractor controller 250 to implement the stop condition. After the tractor controller 250 receives the command from the operator, the tractor controller 250 automatically begins executing the stop condition steps without operator intervention at step 940.

In other embodiments of the invention and as shown in steps 910, 920, and 930 by dashed logic boxes, prior to automatically executing the stop condition, the tractor controller 250 provides the tractor operator with an opportunity to accept or decline the tractor controller 250 automatically stopping the tractor. In step 910, the tractor controller 250 transmits a permission request to the operator to begin initiating automatic tractor stopping. The request may be displayed to the operator by flashing light, lit colored bulb, audio tone, text display, or any other means to notify the operator.

In step 920, the operator determines whether to allow the tractor controller 250 to begin executing the automatic stop or continue tractor operation. In some embodiments of the invention, the operator may acknowledge on an interface connected with the tractor controller 250 that the stop condition may begin. If the operator denies permission to the tractor controller 250, then the tractor controller 250 maintains the current speed and engine rpm in step 930. In some embodiments of the invention, the tractor controller 250 will then request permission again from the operator at a set amount of time following denial from the operator. In some embodiments of the invention, the tractor controller 250 will repeatedly request permission from the operator following denial until operator accepts and, in other embodiments of the invention, the tractor controller 250 will not follow up with another request until the tractor controller 250 receives another zero speed request signal from the operator such as for example by activation of the stop command device 212 in step 360 of FIG. 3. If the operator approves the request to initiate automatic tractor stop, the tractor controller 250 begins automatic tractor stopping in step 940. Steps 910, 920, and 930 are shown in dashed boxes to signify an alternative embodiment, wherein in other embodiments step 940 begins directly after step 380.

At step 940, the tractor controller 250 downshifts gears to slow the speed of the tractor. At step 950, the tractor controller 250 determines whether the tractor speed is low enough to stop the tractor 100 in place and hold the tractor 100 standing still. If the tractor controller 250 determines that the tractor speed is not slow enough, tractor gears are downshifted further in step 940 by tractor controller 250 until a slow enough speed is reached.

Figures 7, 8:
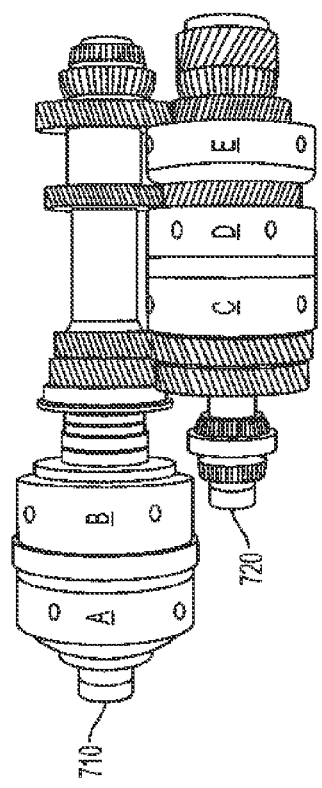
FIG. 7 shows an enlarged external view of particular clutches in the powershift transmission system, shown in FIG. 6.
FIG. 8 shows an exemplary clutch speed table for the powershift transmission system shown in FIG. 6.

At step 955, as shown in FIG. 9, the tractor controller performs an automatic stop condition to the tractor 100 on clutches A, B, C, D, E, F, S, and M shown in the exemplary powershift transmission system in FIG. 6. FIG. 7 shows an enlarged external view of clutches A, B, C, D, and E in combination. FIG. 8 provides an exemplary clutch speed table for the powershift transmission system of FIG. 6 providing clutch combinations corresponding to gear ratios within the transmission system. Referring back to FIG. 9, at step 960, the tractor controller 250 engages clutches C, D, and E all together and at the same. In normal operation, one of clutches C, D, or E are selected in combination with clutch A or B to select a desired gear and thus change tractor speed. By engaging clutches C, D, and E together the tractor controller 250 locks up the transmission preventing the transmission shaft 710, shown in FIG. 6, from turning. The tractor controller 250 then disengages clutches A and B to allow the engine shaft 720, shown in FIG. 6, to rotate in step 970. By disengaging the A and B clutches the engine rotates through the transmission but can not drive clutches C, D, and E. Thus the engine is free to rotate independently from the transmission. In step 980, either one of rear axle differential clutches F, S, or M is then engaged by the tractor controller 250 to connect the rear differential (not shown) to clutches C, D, and E by placing a positive connection between the transmission and the rear axle, effectively locking the rear wheels 112 from rotating. The tractor 100 is thus stopped and standing still at step 990.

In some embodiments of the invention, the stopping sequence, shown in FIG. 9, may be utilized with tractors equipped with autoguidance. Autoguidance is typically used to stop the tractor 100 when the tractor 100 reaches an endpoint, where then autoguidance is automatically disengaged. When disengaged, the operator is required to take back control of the tractor 100. If for some reason the operator fails to take back control, the tractor controller 250 may implement the stopping sequence in method 900 without operator initiation. For example, if the tractor controller 250 does not receive sensed information that a stop command from the operator has been received in a certain amount of time or if the tractor controller 250 does not receive acceptance or denial of the permission request in step 920, then the tractor controller 250 may automatically initiate the stopping sequence beginning at step 940.

FIG. 10 shows tractor restarting sequence conducted by the tractor controller 250 on a tractor transmission system 260, in at least one embodiment of the present invention. An automatic restart sequence may also be executed by the tractor controller 250. Method 1000 may be incorporated in various embodiments of the invention pertaining to the automatic tractor stop and bale wrapping, as described above. After the tractor has reached a speed of zero in step 570 or step 660, and when the operator is satisfied that the bale wrapping and bale ejection has completed, then the operator may initiate the tractor restart by activating a start command device in step 1010. The operator may inform the tractor controller 250 that the operator wants to restart the tractor 100 from standing still with either an acknowledgement command, on for example an interface screen, or by activating a tractor restart sequence device. For example, as in some embodiments because the tractor controller 250 automatically stopped the tractor 100, the shuttle lever remains in the forward position last evoked by the operator on a three position shuttle lever with the tractor 100 now standing still. In some embodiments of the invention, a manual operator initiated sequence to the shuttle lever 122 may inform the tractor controller 250 that the operator desires to restart the tractor 100. For example, in some embodiments of the invention, the operator moves a three-point shuttle lever from the forward position to neutral position and back to forward position or in other embodiments with a momentary type level, the operator presses the neutral button and moves the lever forward. This manual operator initiated sequence informs the tractor controller 250 to restart the tractor 100 following the current selected gear and the speed setpoint coming from the implement. In other embodiments, the speed setpoint may also come from the tractor controller 250. If the operator disables implement control, then the tractor restarts as if in normal operation.

In step 1020, after the tractor controller 250 receives an activation command from the operator to restart, the tractor controller 250 may transmit a permission request to the operator to begin initiating the automatic tractor restart. The request may be displayed to the operator by flashing light, lit colored bulb, audio tone, text display, or any other means to notify the operator.

In step 1030, the operator determines whether to allow the tractor controller 250 to begin executing the automatic restart or leave the tractor 100 at stand still. If the operator denies permission to the tractor controller 250, then the tractor controller 250 maintains the tractor 100 at an approximate zero speed and standing still in step 1040. In some embodiments of the invention, the tractor controller 250 will then request permission from the operator at a set amount of time following permission deny from the operator. In some embodiments of the invention, the tractor controller will repeatedly request permission from the operator following permission denial and, in other embodiments of the invention, the tractor controller 250 will not follow up with another request until the tractor controller 250 receives another restart request signal from the operator. If the operator approves the request to initiate automatic tractor restart, the tractor controller 250 begins automatic tractor restart in step 1050. Steps 1020, 1030, and 1040 are shown in dashed boxes to signify an alternative embodiment, wherein in other embodiments step 1050 begins directly after step 1010.

At step 1050, tractor controller 250 selects a gear for restart. The tractor controller 250 will select a lower gear from an operator pre-selected restart gear, if available, or a gear to match a desired speed at the current engine rpm. The desired speed may be selected by the operator or based on the speed of the tractor 100 prior to initializing any automatic stop sequencing. In some embodiments of the invention, to restart the tractor, the tractor controller 250 restarts the tractor 100 with the same gear utilized when the stopping sequence was initialized. If the tractor controller 250 receives sensed information that the load is too high during restart, then the tractor controller 250 automatically shifts down the gear until the proper gear is achieved for restart. In many embodiments, memory in the tractor controller 250 stores additional information pertaining to engine loads and load torque received continuously from sensors housed in or near the transmission system 260. In some embodiments of the invention, this information is only supplied or stored in memory during particular events, as for example the initiation of a tractor stop or restart sequence. In some embodiments of the invention, the traffic controller 250 selects the gear for restart according to the load on the engine when the stopping sequence began as stored in memory. In some embodiments of the invention, a processor in the tractor controller 250 calculates the available torque at the transmission to restart the tractor 100 to select the gear number at which to restart. To calculate the available torque, the tractor controller 250 calculates the difference between the maximum engine torque at the engine rpm at restart and the total engine load minus the engine load torque fraction due to the transmission. The gear number is then selected by the traffic controller 250 by taking into account the total engine load, the engine load torque fraction, the load torque and maximum engine torque of engine rpm at restart so as not to kill the tractor 100 and achieve a good speed for restart to get to the desired speed as soon as possible.

At step 1060, the tractor controller determines whether the speed of the vehicle is close to a target speed corresponding with the gear engaged from step 1050 and for a target engine rpm. If the target speed is not reached, the tractor controller 250 selects an even lower gear in step 1050.

If the target speed is reached then the tractor controller adjusts the transmission gears and engine rpm in step 1070 to reach the desired vehicle speed. The tractor controller 250 then shifts up the gearing until a requested speed is achieved.

In other embodiments, the cabin 120, in addition to or in alternative to having a brake pedal 126 (see FIG. 1), may include a brake button or switch (not shown), herein called brake switch. The brake switch may be used by an operator to initiate tractor stop and/or tractor travel resume. In other embodiments, the brake switch may be the stop command device 212.

Figure 11:
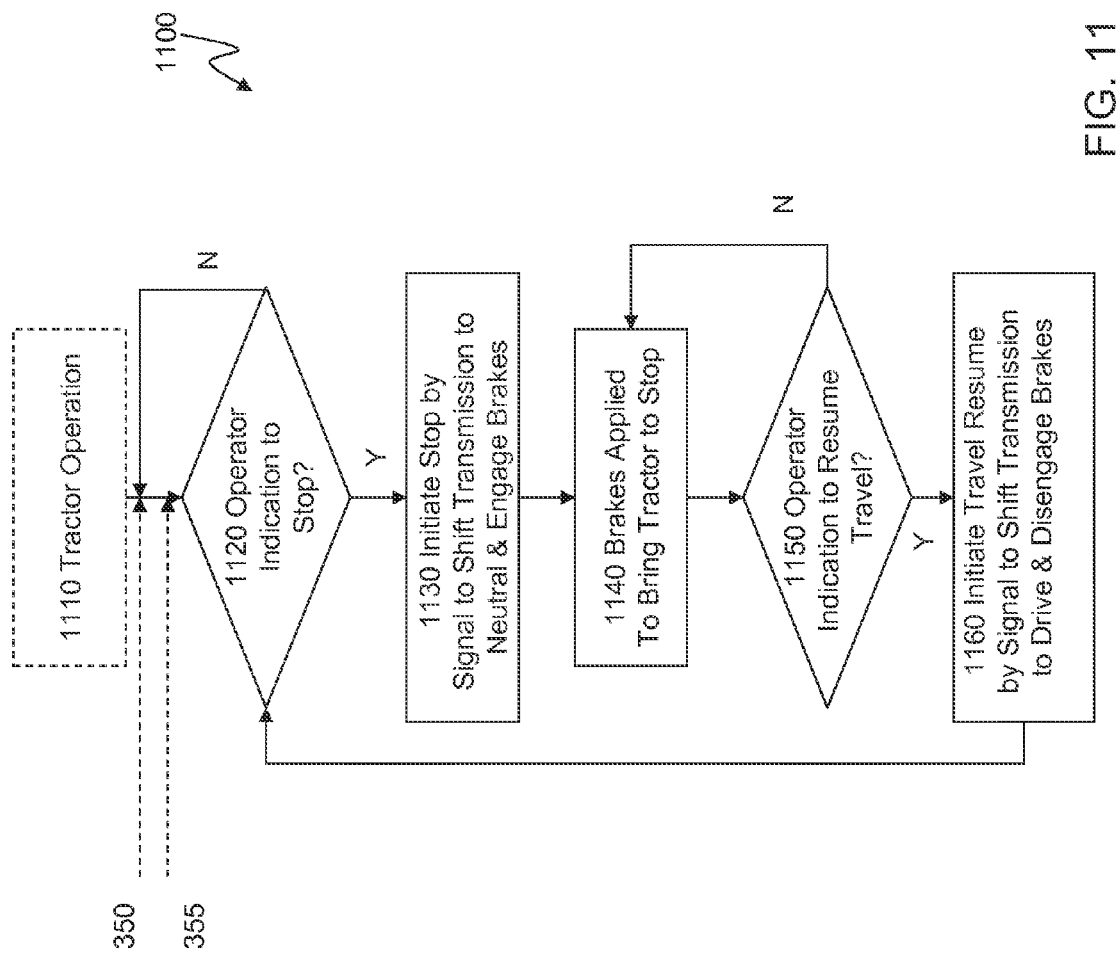
FIG. 11 shows an alternative sequence for stopping a tractor.

FIG. 11 shows an alternative sequence for stopping a tractor in at least one embodiment. The brake application sequence 1100, may be utilized in method 300, which is a sequence for stopping a tractor prior to initiating a bale wrapping sequence (see FIG. 2). At step 1110, the tractor 100 is in normal operation and/or in some form of travel, traveling either forward or in reverse. Step 1110 is shown in a dashed box since it may be an alternative embodiment or input to step 1120. Another embodiment is wherein step 350 (see FIG. 2) is input to step 1120. Step 350 is when the operator determines whether to continue driving and if chooses not to then step 1120 may begin. Step 355 (see FIG. 2) may also be an input to step 1120 when the operator finishes driving the tractor 100.

Step 1120 is a decision step for whether operator initiated the stop brake switch so that tractor controller 250 receives a stop command from the operator. If no indication from operator to stop then step 1120 begins again until an indication to the tractor controller 250 is identified by the tractor controller 250. If a stop indication is received by the operator at the tractor controller, through for example the brake button, then step 1130 begins.

At step 1130, tractor controller 250 initiates tractor stop. At step 1130, the signal to initialize tractor stop is sent from the tractor controller 250 to automatically shift the transmission to neutral and to automatically engage the brakes. The brakes may be electronically connected and communicate electronically with the tractor controller 250. Thus, the brakes may be electronic brakes. If the brake application sequence 1100 is utilized in method 300, then step 1130 may substitute for step 390 in method 300.

At step 1140, brakes are initialized to bring the tractor 100 to a stop or to a speed at or around 0 mph. The remainder of the brake application sequence 1100 is shown in FIG. 11 for when the tractor 100 resumes travel from stop or a speed at or around 0 mph.

At step 1150, a decision step is shown for whether operator initiated stop brake switch so that tractor controller 250 receives a command to move, or resume travel, from the operator. If no indication from operator to resume travel then step 1150 begins again until an indication to the tractor controller 250 is identified by the tractor controller 250 that operator has pressed the brake button to resume travel. If a stop indication is received from the operator at the tractor controller 250, through for example the brake button, then step 1160 may begin.

At step 1160, tractor controller 250 initiates the tractor 100 to resume travel. At step 1160, the signal to resume travel is sent from the tractor controller 250 to automatically shift the transmission back to drive and to automatically disengage the brakes. With the transmission back in drive and brakes disengaged, the tractor 100 may continue operating at the previous operating speed. Transmission to drive may include to move the tractor 100 in the forward or reverse direction. After step 1160, the process begins again at step 1120.

The use of electronic brakes allows for the brakes to include an antilocking feature normally found in the automotive industry to prevent the wheels from kicking and thus damaging soil surface under tractor 100.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed:

1. A powershift transmission system comprising:
   an engine shaft operably connected to at least one engine clutch, the engine shaft driving operational rotation of an engine;
   a transmission shaft operably connected to at least one transmission clutch, the transmission shaft mechanically linked to one or more gears responsible for rotation of the transmission shaft;

a differential comprising at least one axle and at least one differential clutch; and at least one controller;

wherein the at least one controller engages and disengages each of the at least one engine clutches and at least one transmission clutches simultaneously or independently, wherein a combination of the at least one engine clutch with the at least one transmission clutch and the at least one differential clutch corresponds to a gear ratio within the system to control speed and direction of axle rotation;

wherein, when the at least one differential clutch becomes engaged, the at least one axle rotates at least one of a speed and direction that corresponds to the gear ratio;

and wherein the at least one controller is configured to stop movement of the at least one axle while simultaneously allowing the engine shaft to freely rotate in the absence of activation of a brake system.

2. The powershift transmission system of claim 1, wherein the at least one controller is configured to stop the movement of the at least one axle and an associated vehicle while simultaneously allowing the engine shaft to freely rotate by disengaging each of the at least one engine clutches, engaging all of the at least one transmission clutches simultaneously, and disengaging at least one differential clutch.

3. The powershift transmission system of claim 1, wherein the powershift transmission system is adjustable by manual input from an operator or programmable input from the operator into an at least one memory of the at least one controller.

4. The powershift transmission system of claim 1, wherein the system further comprises
a tractor stop command device; and
a processor that is automatically controlled by the at least one controller.

5. The powershift transmission system of claim 1, wherein the at least one controller stops the movement of the at least one axle by adjusting the powershift transmission system based at least partially upon information pertaining to speed received by the at least one controller from one or more speed sensors.

6. The powershift transmission system of claim 1, further comprising a tractor operator interface connected to the at least one controller to transmit to an operator a permission request to initiate a stop command prior to at least one controller stopping movement of the at least one axle.

7. The powershift transmission system of claim 1, wherein there are at least two engines clutches.

8. The powershift transmission system of claim 1, wherein there are at least three transmission clutches.

9. The powershift transmission system of claim 1, wherein there are at least four differential clutches.

10. The powershift transmission system of claim 1, wherein the at least one controller is configured to stop the movement of the at least one axle while simultaneously allowing the engine shaft to freely rotate by sequentially: disengaging each of the at least one engine clutches, engaging all of the at least one transmission clutches simultaneously, and disengaging at least one differential clutch.

11. The powershift transmission system of claim 1, wherein the at least one controller determines whether the decelerating tractor speed has crossed a deadband value at or around 0 mph.

12. The powershift transmission system of claim 1, wherein the powershift transmission system is connected to one or more ISOBUS systems.

13. The powershift transmission system of claim 1, wherein the at least one axle is the rear axle of a tractor wherein the axle is connected to around engaging elements of the tractor.

14. A tractor in combination with a powershift transmission system comprising:
an engine shaft operably connected to at least one engine clutch, the engine shaft driving operational rotation of an engine;
a transmission shaft operably connected to at least one transmission clutch, the transmission shaft mechanically linked to one or more gears responsible for rotation of the transmission shaft;
a differential comprising at least one axle and at least one differential clutch; and at least one controller;
wherein the at least one controller engages and disengages each of the at least one engine clutches and at least one transmission clutches simultaneously or independently, wherein a combination of the at least one engine clutch with the at least one transmission clutch and the at least one differential clutch corresponds to a gear ratio within the system to control speed and direction of axle rotation;
wherein, when the at least one differential clutch becomes engaged, the at least one axle rotates at least one of a speed and direction that corresponds to the gear ratio; and
wherein the at least one controller is configured to stop movement of the at least one axle while simultaneously allowing the engine shaft to freely rotate in the absence of activation of a brake system.

15. A method of baling harvested crop comprising driving a tractor comprising a powershift transmission system and a brake system, wherein the tractor is operably connected to a baler; and wherein the powershift transmission system comprises:
an engine shaft operably connected to at least one engine clutch, the engine shaft driving operational rotation of an engine;
a transmission shaft operably connected to at least one transmission clutch, the transmission shaft mechanically linked to one or more gears responsible for rotation of the transmission shaft;
a differential comprising at least one axle connected to around engaging elements of the tractor and at least one differential clutch; and
at least one controller;
wherein the at least one controller engages and disengages each of the at least one engine clutches and at least one transmission clutches simultaneously or independently, wherein a combination of the at least one engine clutch with the at least one transmission clutch and the at least one differential clutch corresponds to a gear ratio within the system to control speed and direction of axle rotation;
wherein, when the at least one differential clutch becomes engaged, the at least one axle rotates at least one of a speed and direction that corresponds to the gear ratio; and
wherein the at least one controller is configured to stop movement of the at least one axle impeding movement of the tractor while simultaneously allowing the engine shaft to freely rotate in the absence of activation of a brake system.

16. The method of claim 15, wherein the at least one controller is configured to stop the movement of the at least one axle of the tractor while simultaneously allowing the engine shaft to freely rotate by sequentially or simultaneously: disengaging each of the at least one engine clutches, engaging all of the at least one transmission clutches, and disengaging at least one differential clutch.

17. The method of claim 15, wherein the at least one controller is configured to stop the movement of the at least one axle of the tractor while simultaneously allowing the engine shaft to freely rotate by sequentially or simultaneously: disengaging each of the at least one engine clutches, engaging all of the at least one transmission clutches, and disengaging at least one differential clutch.

18. The method of claim 15, wherein the method further comprises: (i) initiating a stop sequence to stop the tractor at the at least one controller the movement; and (ii) wrapping a bale in a bale chamber.

19. The method of claim 18, further comprising restarting the tractor by the tractor controller after the bale in the bale chamber is wrapped, wherein the at least one controller selects a gear to achieve a same speed of the tractor before the at least one controller initiates the stopping sequence, wherein the at least one controller factors a total engine load, an engine load torque fraction, a load torque, and a maximum engine torque of engine rpm for restart, and wherein the at least one controller calculates the available torque from a difference between maximum engine torque for engine rpm at restart and a total engine load minus an engine load torque fraction to select the gear.

20. The method of claim 18, further comprising restarting the tractor by the at least one controller after the bale in the bale chamber is wrapped, wherein the at least one controller selects a gear to reach a desired speed from a target speed at current engine rpm and selects lower gears to achieve the target speed before adjusting transmission gears and engine rpm to reach the desired speed.

21. The method of claim 18, wherein initiating at the tractor controller a stop sequence comprises automatically shifting a tractor transmission to neutral and engaging tractor brakes.

* * * * *